Feb. 3, 1959 — J. L. GIBBONEY ET AL — 2,872,196
ROTARY SPREADER FOR TRACK VEHICLE
Filed Oct. 13, 1954 — 3 Sheets-Sheet 1

INVENTORS:
JAMES L. GIBBONEY
CHESTER A. BROWN
FRED KRUEGER

BY Marzall, Johnston,
Cook & Root

ATT'YS

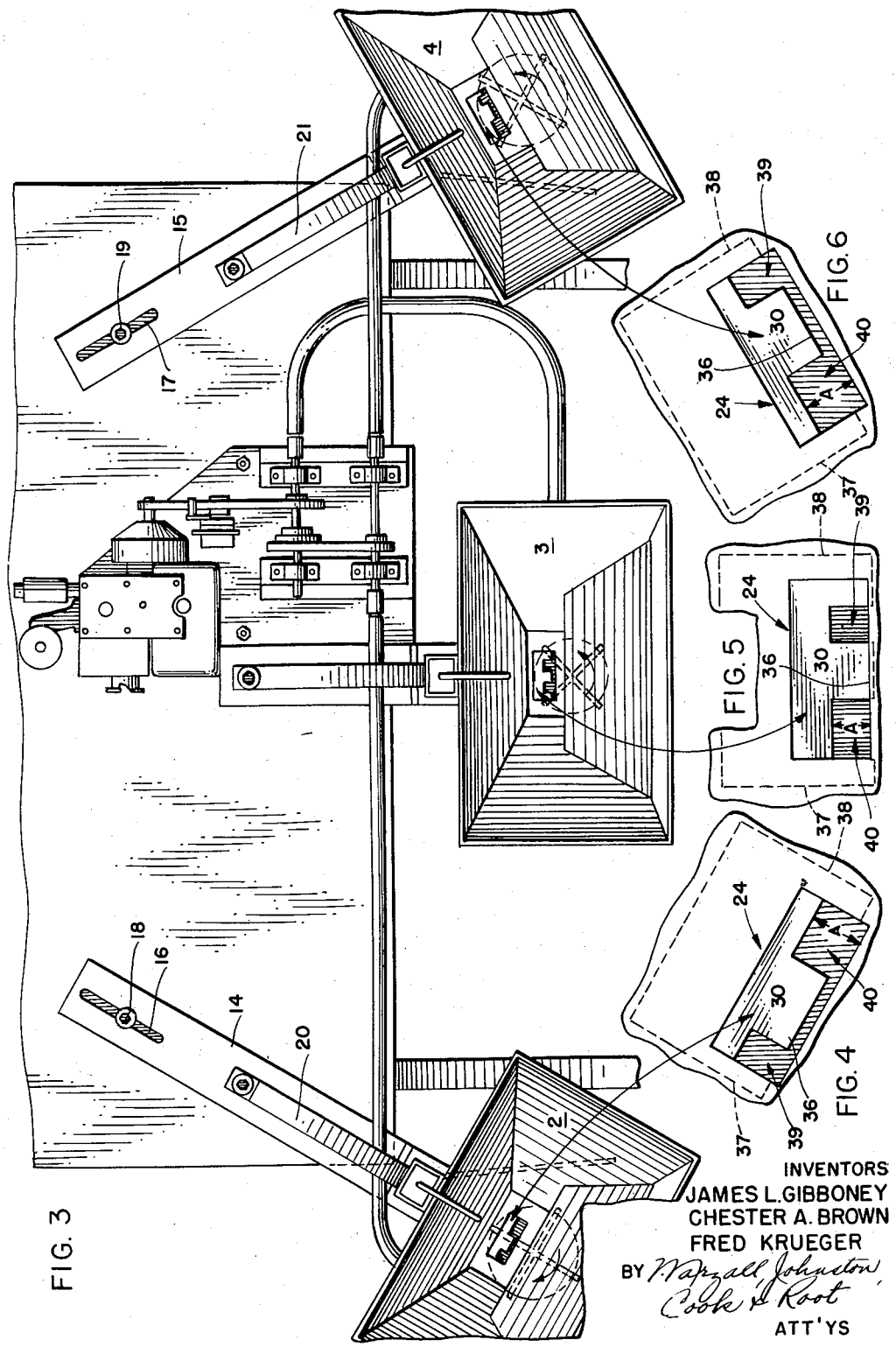

Feb. 3, 1959  J. L. GIBBONEY ET AL  2,872,196
ROTARY SPREADER FOR TRACK VEHICLE
Filed Oct. 13, 1954  3 Sheets-Sheet 3
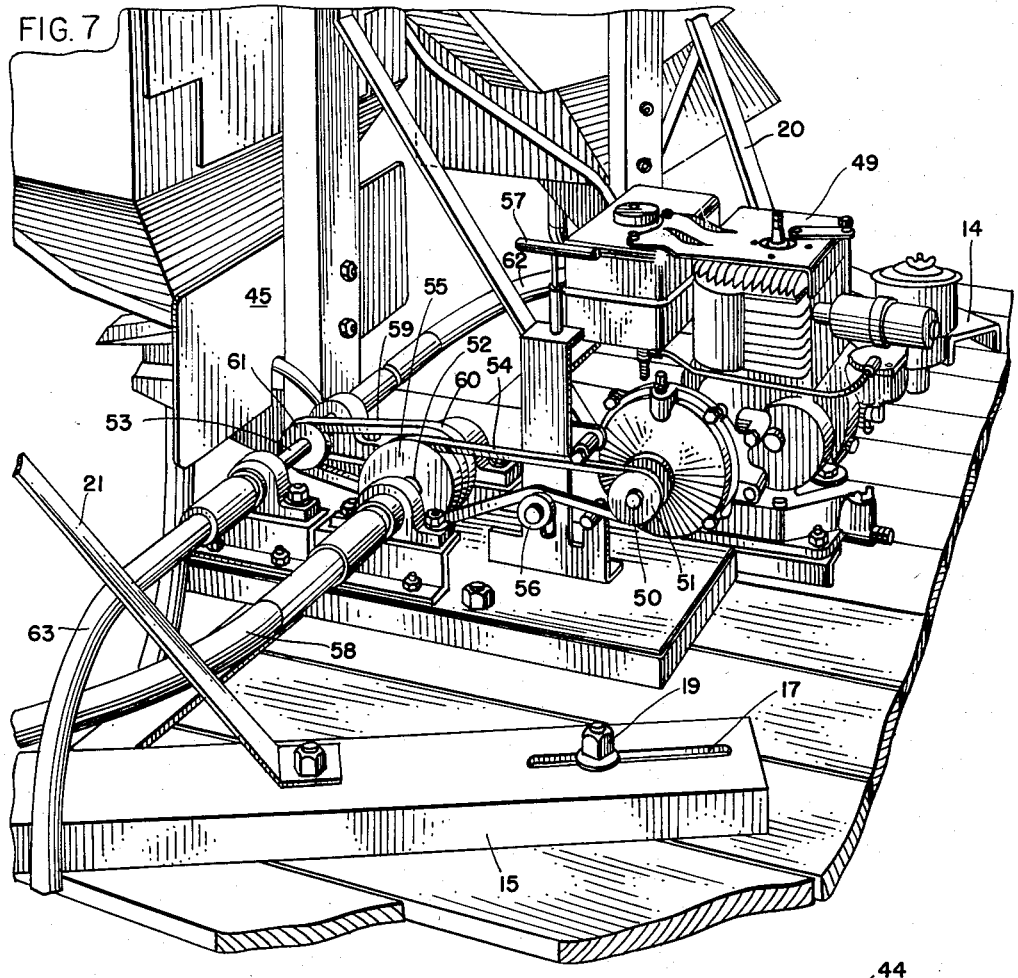
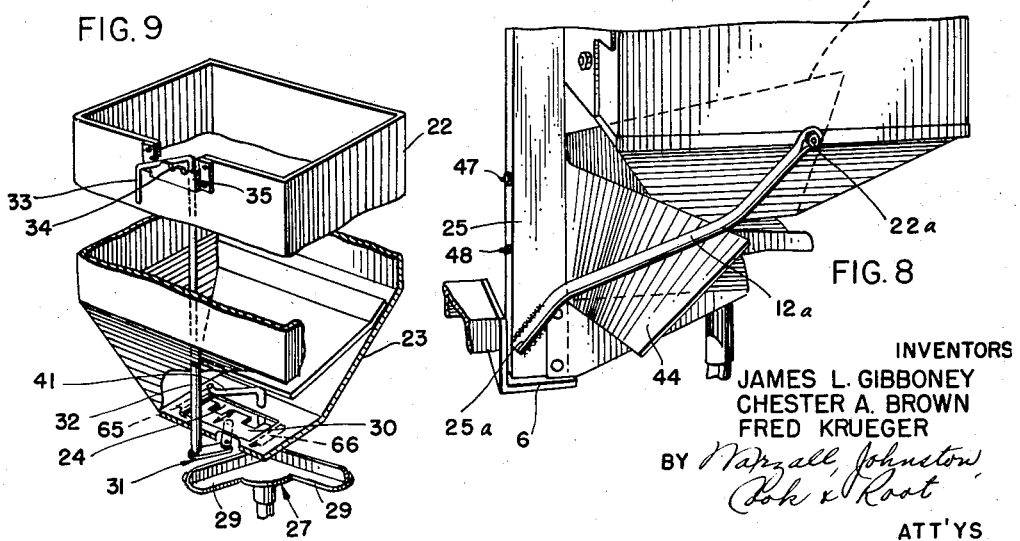
INVENTORS
JAMES L. GIBBONEY
CHESTER A. BROWN
FRED KRUEGER
ATT'YS

United States Patent Office 2,872,196
Patented Feb. 3, 1959

2,872,196
ROTARY SPREADER FOR TRACK VEHICLE

James L. Gibboney, La Grange Park, Chester A. Brown, Oak Park, and Fred Krueger, Oak Lawn, Ill., assignors to National Aluminate Corporation, Chicago, Ill., a corporation of Delaware Application October 13, 1954, Serial No. 461,982

1 Claim. (Cl. 275—8)

This invention relates to a track spreader and in particular to a device for spreading a powdered material such as a weed killing compound or the like between railroad tracks and alongside the right of way.

The railroad industry is continuously confronted with the problem of applying weed control compositions between railroad tracks and alongside the right of way. Liquid weed killing compositions may be used and are well adapted to uniform application by spraying with any suitable device. However, many effective herbicides are not readily dispersible in suitable liquids. Furthermore, some herbicides are more effective in killing weeds and grasses and in preventing regrowth when they are applied as solid discrete particles. Granular or powdered type herbicidal compounds are also sometimes more effective in preventing weed growth for a long period of time because they are not easily diluted or washed away by rain.

The problem of using granular or powdered herbicidal compounds arises in the even distribution of these compounds between the tracks and alongside the right of way. It is desirable to spread only the minimum amount of compound to prevent weed and grass growth over a given area. At the same time, it is desirable to cover the infested area completely. Since the thickness of plant growth and the area that is covered may vary, it is also desirable to be able to regulate both the amount of compound distributed and the area covered by the spreading device.

One object of this invention is to provide a track spreader which will evenly distribute a powdered material between railroad tracks and alongside the right of way.

Another object of the invention is to provide a track spreader whereby a powdered material is fed at a regulated rate from a plurality of hoppers to rapidly rotating discs, said discs evenly distributing the powdered material between the tracks and alongside the right of way, and the controlled speed of rotation of these discs determining the area to which the powdered material is spread.

Still another object of the invention is to provide spreading devices which are easily adapted to a vehicle such as a flatcar or the like which can be operated upon railroad tracks.

Yet another object of the invention is to provide a plurality of spreading devices so situated on a railway car or the like as to evenly distribute a regulated amount of powdered material between the railroad tracks and alongside the right of way so that the area of right of way covered is controllably different from the area between the tracks.

To the attainment of these ends and the accomplishment of other new and useful objects as will appear, the invention consists in the features of novelty in substantially the construction, combination, and arrangement of the several parts, hereinafter more fully described and claimed, and shown in the accompanying drawings exemplifying one embodiment of this invention, in which:

Fig. 3 is a plan view of the general location of three mechanical spreaders, motor, and drive mechanism mounted upon the rear portion of a flat railway car, showing flexible drive shafts connecting the drive mechanism to said spreaders;

Figure 1:
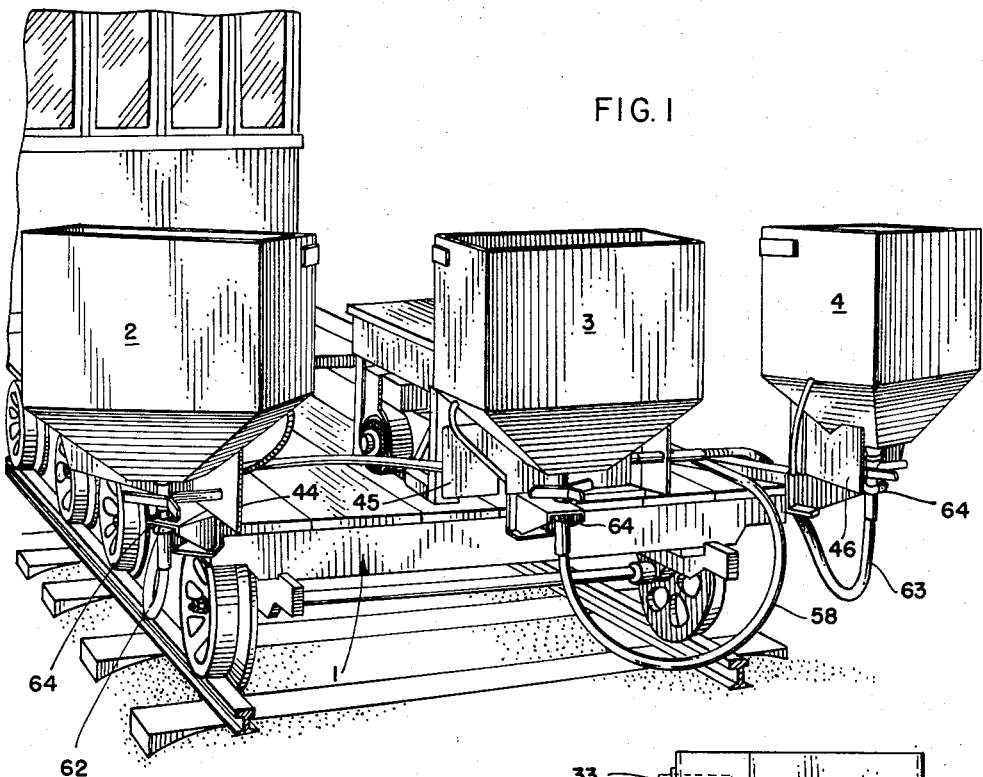
Fig. 1 is a rear perspective view of a railway car showing three mechanical spreaders mounted thereon, said spreaders being driven by a single motor through flexible drive shafts.

Figs. 4, 5, and 6 are enlarged plan views of the bottom central portions of the corresponding feed hoppers of Fig. 3 showing the shape of regulating feed plates located therein;

Fig. 7 is a detailed perspective view of a motor showing three flexible shafts connected through a drive mechanism which is engaged by a simple clutch;

Fig. 8 is a partial perspective view of the lower end of a mechanical spreader showing the location of the baffle for the spreader on the left side of the flatcar in Fig. 1; and Fig. 9 is a detailed perspective view of a mechanical spreader with parts broken away showing the adjustment of a regulating feed plate and operation of an agitator.

Figure 2:
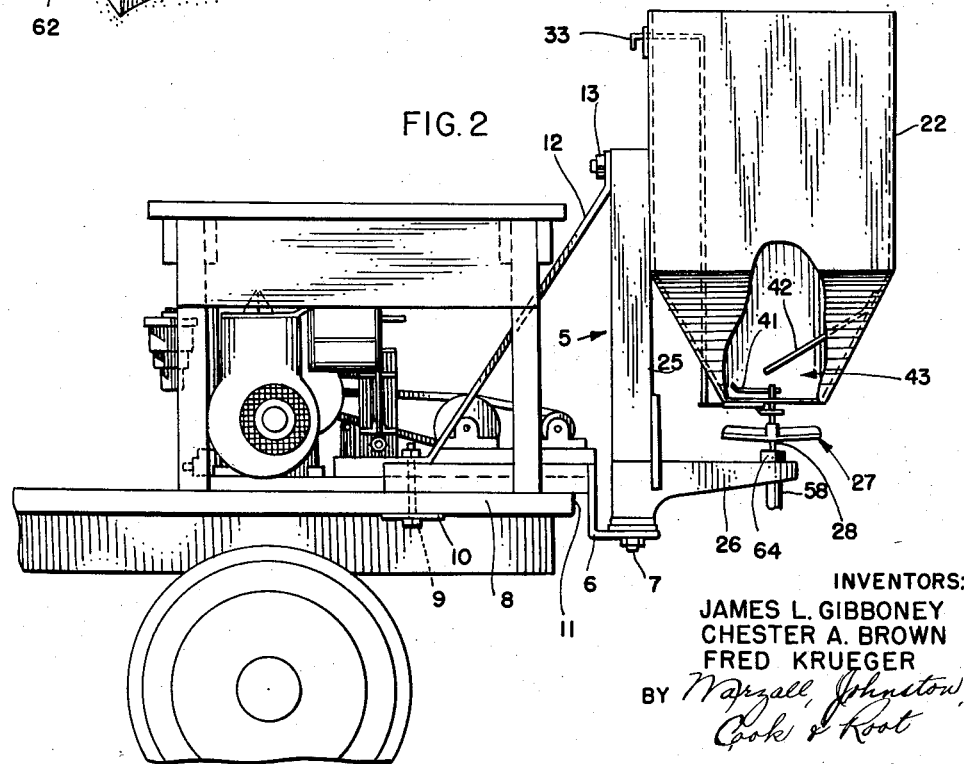
Fig. 2 is a side elevational view of the rear portion of a railway car showing a mechanical spreader mounted centrally thereon, parts broken away to show the interior of the feed hopper of said spreader, and a motor and drive mechanism mounted in front of said spreader with a protective platform covering said motor.

The track spreader herein shown for the purpose of illustrating and describing the present invention includes a vehicular supporting base or platform such as a railway flatcar 1, as illustrated in Fig. 1, upon which are detachably mounted three mechanical spreaders 2, 3, and 4. The mechanical spreader 3 is mounted centrally on the rear portion of the flatcar 1 by means of an iron channel support generally shown at 5 secured to channel bottom support 6 by a bolt and nut 7. The channel support 6 is bolted to the floor 8 of the flatcar 1 by a bolt and nut assembly 9, a reinforcing plate 10 being inserted beneath the floor, substantially as shown in Fig. 2. The support 6 extends horizontally past the rear edge 11 of the flatcar in order to project the spreader outwardly therefrom. The support 5 is held in a vertical position by brace 12 which is bolted at the lower end by means of bolt and nut assembly 9 to the floor of flatcar 1 and fastened at the upper end by means of bolt and nut assembly 13 to the upper end of support 5.

The two outside spreaders 2 and 4 are shown in Figs. 1 and 3 to be laterally disposed from the central spreader 3 and mounted from supports 14 and 15, respectively, provided with a longitudinal adjusting slot 16 and 17, respectively, which permits the outside spreaders to be moved in and out from the flatcar. Once these outside spreaders are positioned, they are held firmly in place by bolt and nut assemblies 18 and 19, respectively. If necessary, a shim (not shown) may be inserted between the floor 1 and support members 14 and 15, respectively, either to level the outside spreaders or to provide a smooth surface to partially rotate the support members 14 and 15 in a horizontal plane. The outer spreaders 2 and 4 are further supported by braces 20 and 21, respectively, similar to brace 12. Each of the spreader units 2, 3 and 4 is also supported on opposite sides with a steel brace 12a welded to the vertical support 25 at 25a and fastened to the hopper 22 at 22a, as shown in Fig. 8.

The mechanical spreaders are substantially of the same construction, except as noted hereinafter, and are best illustrated by Figs. 2 and 9. Each spreader includes essentially a hopper 22 adapted to contain a flowable material such as a powdered weed killing compound. The hopper 22 is preferably rectangular in cross-section and tapers in the lower portion 23 toward a bottom opening 24. Each hopper support 5 is L-shaped, having an upright arm 25 and a horizontal arm 26. Each hopper is suitably attached to said upright arm 25 by bolting or welding. A rotatable spreader disc generally shown at 27 located beneath each hopper is mounted on a shaft 28 offset laterally with respect to opening 24 so that the powder from the hopper falling through opening 24 will strike spreader vanes 29 and be thrown outwardly therefrom.

As shown in Fig. 9, the size of the feed opening 24 is regulated by a horizontally sliding feed plate 30 connected by a lever arm linkage 31 to a perpendicular, partially rotatable shaft 32. The upper end of this shaft 32 is bent to form an inverted U-shape handle 33 which rests in one of a plurality of notches 34 in a plate 35 fastened to the upper edge of each feed hopper 22, each notch providing a different setting of the feed plate.

The feed plate 30 of spreaders 2, 3, and 4 are shown in detail in Figs. 4, 5, and 6, respectively, each plate having a leading edge 36, a left edge 37, and a right edge 38. Each feed plate has two rectangular openings 39 and 40 cut from the leading edge 36 thereof, the larger portion 40 being adjacent the right edge 38 of the feed plate in the left spreader 2 (Fig. 4) and adjacent the left edge 37 of the feed plates in the central spreader 3 (Fig. 5) and right spreader 4 (Fig. 6). This arrangement permits the flow of powdered material through the feed opening 24 to be divided into two streams whereby the greatest amount of material is fed to the rotating disc 27 (Fig. 9) as the radial vanes 29 carry the material in an outward direction. The rectangular cutout portions 39 and 40 of the feed plate 30 in the central spreader 3 are preferably smaller than those of the laterally disposed spreaders 2 and 4 since the central spreader generally covers a lesser area and therefore usually requires that less material be spread.

It is advantageous to mount a horizontally rotatable agitator 41 above the spreader disc 27 upon an extension of the spreader disc shaft 28 so that the agitator is contained within the lower portion of the hopper 22, as shown in Figs. 2 and 9, thereby breaking up any caking tendency and insuring the steady flow of powdered material. The spreader disc shaft 28 is held in place by channeled support 26 shown in Fig. 2, and by the bottom of the hopper itself as shown in Fig. 9 where said shaft rotates in an opening in the bottom of the hopper adjacent the feed opening.

Fig. 2 shows that it is also advantageous to provide the hopper 22 with a downwardly projecting baffle 42 which will direct the flow of powdered material to the feed opening 24 and will also provide a pocket 43 comparatively free of feed material giving the agitator 41 greater freedom of action.

Apart from the feed plates 30, the only difference in construction of the spreaders is the location and shape of the baffles 44, 45, and 46, as shown in Fig. 1. These baffles are shaped so as to direct the dispersion of powdered material to desired areas and are preferably attached to the L-shaped support 25 by two bolts 47 and 48, as shown in Fig. 8.

A means for driving the rotatable discs 27 is best illustrated by Figs. 3 and 7 which show a variable speed motor 49, preferably a gasoline powered engine, mounted upon the vehicle 1 and having a drive shaft 50 with a pulley 51 attached thereon. A variable drive mechanism is interposed between motor 49 and rotatable discs 27, and is herein shown to include two parallel rotatable shafts 52 and 53. A belt 54 from the pulley 51 is trained over a pulley 55 on shaft 52, said belt being tightened by raising a clutch wheel 56 attached to a clutch handle 57 whenever an operative connection is desired.

A flexible shaft 58 is coupled to the first parallel shaft 52, and is coupled at the other end to the rotatable disc 27 of the central spreader 3 so that this disc rotates in a counterclockwise direction. A grip link belt 59 runs from a second pulley 60 on the first parallel shaft 52 and is trained over a step-down pulley 61 on the second parallel shaft 53. It is preferable to provide a plurality of step-down pulleys on shaft 53 similar to pulley 61 but of varying sizes in order that the speed of rotation can be controlled by changing the drive belt 59 to a different pulley.

The second parallel shaft 53 is coupled at opposite ends to a pair of flexible shafts 62 and 63 which are operatively coupled to the rotatable discs on the laterally disposed spreaders 2 and 4, respectively, such that the disc on the left spreader 2 rotates in a clockwise direction and the disc on the right spreader 4 rotates in a counterclockwise direction. It will be seen that the greater the speed of the second parallel shaft 53 the more rapidly will the spreader discs 27 of the laterally disposed spreaders 2 and 4 rotate, thereby covering an increasingly greater area than the central spreader 3. All of the flexible shafts can be held in an upright position at the point where they are coupled to the rotatable spreader discs by being mounted in clamps 64 attached to the horizontal arm 26 of the L-shaped support 5 as shown in Figs. 1 and 2.

In general, the operation of the track spreader may be described as follows:

The spreaders 2, 3, and 4, motor 49, and the drive mechanism are mounted upon a flatcar 1 substantially as described hereinabove, with the added precaution that sufficient counterweight should be provided to prevent tipping of the flatcar. The motor is started with the clutch handle 57 in a downward position so that the belt 54 is loose and will not drive pulley 55. A quantity of powdered herbicidal material is added to the feed hopper of the central spreader 3 and the clutch handle 57 is raised thereby tightening belt 54 and causing the motor to drive pulley 60. The speed of the motor is then adjusted so that the central spreader distributes the powdered material between the rails of the railroad track. The proper rotation of the spreader discs 27 should also be checked. The area covered by the laterally disposed spreaders is determined by the selection of a suitable step-down pulley 61, and this area may also be varied by moving the laterally disposed spreaders in or out through the slot 17 in the iron channel support 15. Powdered material is added to the feed hoppers as required, and a sufficient supply can be carried upon the flatcar.

The rate of discharge of powdered material is regulated by changing the size of the hopper feed opening 24 through manipulation of the feed plates 30. The position of these feed plates 30 can be changed by moving handle 33 in notches 34 thereby turning control shaft 32 which moves the levers indicated at 31 (Fig. 9) causing feed plate 30 to slide in guides 65 and 66 and change the size of openings 39 and 40 (Figs. 4, 5 and 6).

The following table will illustrate the feeder plate adjustment and rate of flow with a given herbicidal material.

*Table I*

|  | Setting No. 1 | | Setting No. 2 | | Setting No. 3 | |
| --- | --- | --- | --- | --- | --- | --- |
|  | Dim. "A," inches | Lbs./ Min. | Dim. "A," inches | Lbs./ Min. | Dim. "A," inches | Lbs./ Min. |
| Side Hoppers | 11/16 | 20 | 15/16 | 30 | 1 1/16 | 40 |
| Center Hopper | 1/2 | 11 1/2 | 11/16 | 17 | 13/16 | 22 3/4 |

It will be observed that when the handle 33 is in setting No. 1, dimension "A" (Figs. 4, 5 and 6) is smallest and the feed rate is also the smallest. As handle 33 is moved counterclockwise to settings Nos. 2 and 3, dimension "A" is increased and the feed rate is likewise increased. In every case at a given setting the feed rate for the side hoppers 2 and 4 is greater than that for the central hopper 3. However, if desired, the feed rates can be adjusted so that the rate of distribution by the center spreader is greater than that of either outer spreader.

The following table shows the effect of track speed on the distribution of a given herbicide.

*Table II*

| Track Speed | Pounds Herbicide Discharged Per Acre | | |
|---|---|---|---|
| | Setting No. 1 | Setting No. 2 | Setting No. 3 |
| 4 M. P. H., 15 min./mile | 300 | 450 | 600 |
| 5 M. P. H., 12 min./mile | 240 | 360 | 480 |
| 6 M. P. H., 10 min./mile | 200 | 300 | 400 |
| 7 M. P. H., 8.58 min./mile | 172 | 258 | 342 |
| 8 M. P. H., 7.5 min./mile | 150 | 225 | 300 |

The figures in this table are based on the sids hoppers spreading over an area 8 feet 3 inches wide, or one acre per mile, and the center hopper spreading between the tracks over an area 4 feet 8 inches wide, or .565 acre per mile.

If desired the spreader plate openings can be adjusted while the spreaders are in operation in order to vary the discharge according to the extensiveness of vegetation growth. Feed plates having smaller or larger openings can be substituted for the feed plates previously described.

A number of variations and modifications can be made without departing from the invention. For example, the spreader plates and the operating mechanism therefor can be so constructed as to provide one position in which there is no flow of powdered material from the hoppers.

Some routine experimentation is required in determining the speed of the spreader discs, the position of the laterally disposed spreaders, the size of the feed opening, and the rate of track speed. However, the invention provides a track spreader which is very flexible and is well adapted to the even distribution of a powdered material over a wide range of areas and in varying concentrations.

The invention is hereby claimed as follows:

A track spreader for spreading powdered material between and along the sides of a railroad track comprising a vehicle movable along such rails through a path of travel, a plurality of spreader means, each comprising a horizontally rotating spreading disc for spreading such material during the operation of said spreader means, means supporting one of said spreader means on said vehicle centrally of the rails and overhanging one end of said vehicle in position to spread said material between said rails upon operation of said one spreader means during movement of said vehicle along said path of travel, means supporting the others of said spreader means laterally, one on each side of said vehicle outside of said rails in position to spread said material adjacent to and outside of said rails upon operation of said vehicle along said path of travel, the distribution from the central spreader means being between the rails and distribution from the lateral spreader means covering a variable range at the sides of the rails, motor driving means mounted on said vehicle, driven means connected to said plurality of said spreader means in position to effect operation of the latter, and a variable drive mechanism operatively connected between said motor driving means and said driven means to vary the distribution of said powdered material by said lateral spreader means as compared with said central spreader means by variably controlling the speeds of rotation of said lateral spreader discs as compared with said central spreader disc.

References Cited in the file of this patent

UNITED STATES PATENTS

| | | |
|---|---|---|
| 842,073 | Browning | Jan. 22, 1907 |
| 1,751,928 | Lachner | Mar. 25, 1930 |
| 2,243,996 | Baughman | June 3, 1941 |
| 2,547,143 | Speicher | Apr. 3, 1951 |